No. 773,076. PATENTED OCT. 25, 1904.
J. IMBLER.
WIRE FENCE MACHINE.
APPLICATION FILED FEB. 3, 1904.
NO MODEL. 11 SHEETS—SHEET 1.

Fig. 1.

Witnesses
Frank A. Fahle
J. A. Walsh

Inventor
John Imbler
By
Bradford & Hood
Attorneys

No. 773,076. PATENTED OCT. 25, 1904.
J. IMBLER.
WIRE FENCE MACHINE.
APPLICATION FILED FEB. 3, 1904.
NO MODEL. 11 SHEETS—SHEET 2.

Witnesses
Frank A. Fahle
J. A. Walsh

Inventor
John Imbler
By
Bradford & Hood
Attorneys

No. 773,076. PATENTED OCT. 25, 1904.
J. IMBLER.
WIRE FENCE MACHINE.
APPLICATION FILED FEB. 3, 1904.
NO MODEL. 11 SHEETS—SHEET 4.

Witnesses
Inventor
John Imbler
By
Bradford & Hood
Attorneys

No. 773,076. PATENTED OCT. 25, 1904.
J. IMBLER.
WIRE FENCE MACHINE.
APPLICATION FILED FEB. 3, 1904.
NO MODEL. 11 SHEETS—SHEET 5.

Inventor
John Imbler
By
Bradford & Hood
Attorneys

Witnesses

No. 773,076. PATENTED OCT. 25, 1904.
J. IMBLER.
WIRE FENCE MACHINE.
APPLICATION FILED FEB. 3, 1904.
NO MODEL. 11 SHEETS—SHEET 6.

Witnesses
Inventor
John Imbler
By
Bradford Hood
Attorneys

No. 773,076. PATENTED OCT. 25, 1904.
J. IMBLER.
WIRE FENCE MACHINE.
APPLICATION FILED FEB. 3, 1904.
NO MODEL. 11 SHEETS—SHEET 11.

Inventor
John Imbler

By Bradford Hood
Attorneys

No. 773,076.

Patented October 25, 1904.

UNITED STATES PATENT OFFICE.

JOHN IMBLER, OF ZIONSVILLE, INDIANA.

WIRE-FENCE MACHINE.

SPECIFICATION forming part of Letters Patent No. 773,076, dated October 25, 1904.

Application filed February 3, 1904. Serial No. 191,809. (No model.)

*To all whom it may concern:*

Be it known that I, JOHN IMBLER, a citizen of the United States, residing at Zionsville, in the county of Boone and State of Indiana, have invented certain new and useful Improvements in Wire-Fence Machines, of which the following is a specification.

The object of my invention is to produce a machine for making wire fence of the "square-mesh" type which is composed of a series of longitudinal running-wires and a plurality of cross or picket wires arranged at desired intervals. In the type of machine here shown mechanism is provided for securing the picket-wires to the running-wires by means of the peculiar tie-wire described and claimed in Patent No. 706,948, issued to me August 12, 1902, the operation of said machine being entirely automatic in all of its parts.

The accompanying drawings illustrate my invention.

Fig. 3, a complete elevation of one side of the machine; Figs. 7 and 8, a corresponding front elevation of the parts shown in Figs. 5 and 6, respectively; Figs. 9, 10, 11, 12, and 13, sectional details of one of the twister-boxes for automatically attaching the peculiar stay-wire tie referred to, Fig. 12 being a section on line 12 12 of Fig. 11, and Fig. 13 a similar section on line 13 13 of Fig. 9; Figs. 14, 15, and 16, details of the twister-box for twisting the upper or right-hand end of the picket-wires about the adjacent running-wire, Fig. 16 being a section on line 16 16 of Fig. 14; Figs. 17, 18, and 19, details of the twister-box for twisting the lower or left-hand end of the picket-wires about the adjacent running-wire; Fig. 26, an enlarged front elevation of the means for straightening and feeding the tie-wires; Fig. 27, a side elevation thereof; Fig. 28, a section on line 28 28 of Fig. 26, and Fig. 29 a section on line 29 29 of Fig. 28.

The running-wires 40 are brought from any suitable source of supply over guide-rollers 41 and from thence upward over a drum 42, journaled at the top of the machine. From this said wires are carried downwardly over a similar guiding-drum 43, thence backward over the crimping and feeding mechanism 44, (to be described in detail later,) and thence to the storage-drum 45.

The material 46 for the cross or picket wires is brought between a pair of friction feed-rollers 47 47 and by them pushed through a straightening device 48 and thence through a hardened tube 49, the end of which lies adjacent the end of the picket-magazine 50, said end of tube 49 being supported by an adjustable abutment 51.

The material 52 for the stay-wire ties is brought from suitable storage-drums 53 over suitable tension-idlers 54 and from thence upward between straightening-rollers 55 and guides 56.

Figure 1:
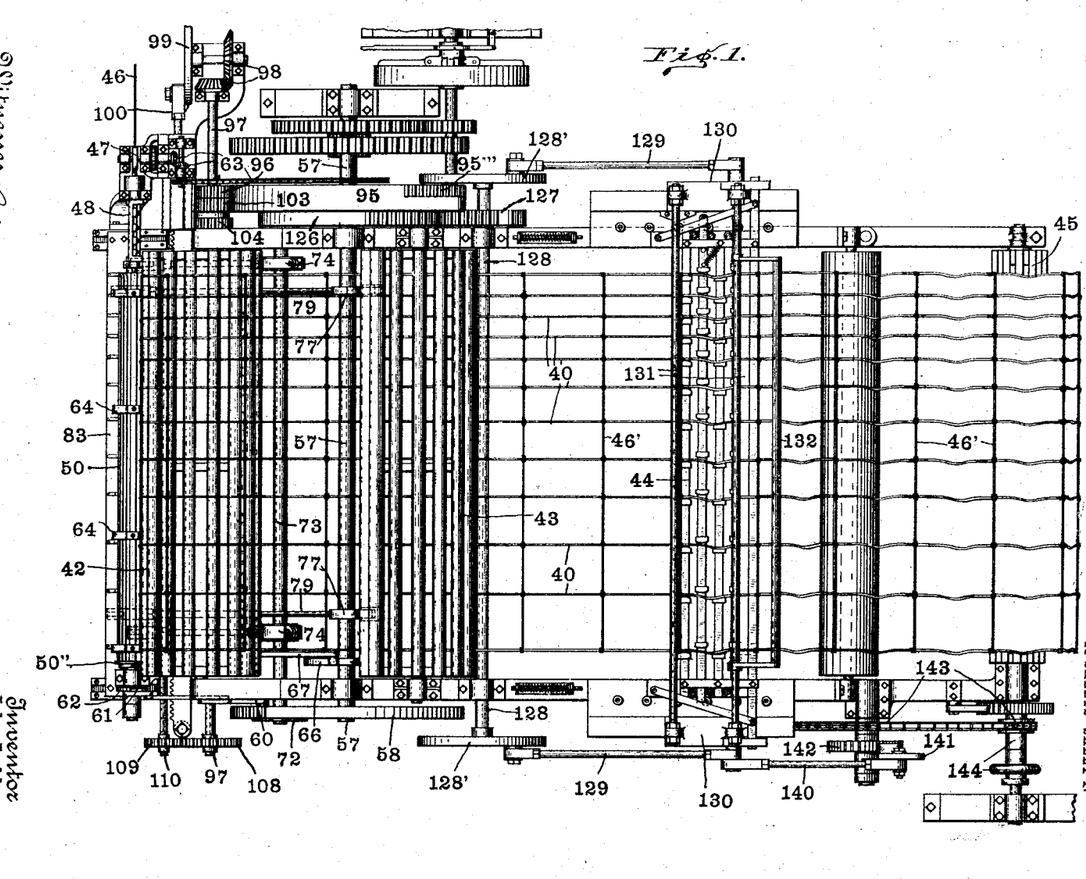
Figure 1 is a plan of the entire machine.
Figure 2:
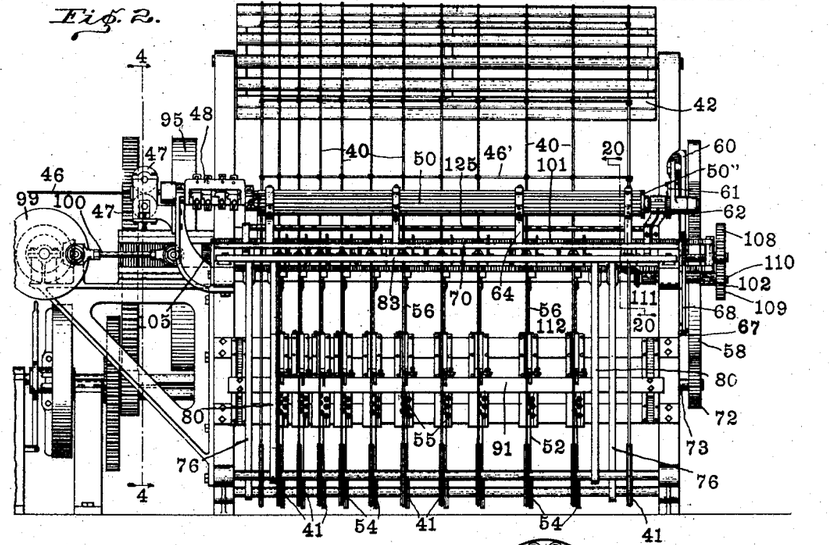
Fig. 2, a front elevation.
Figure 5:
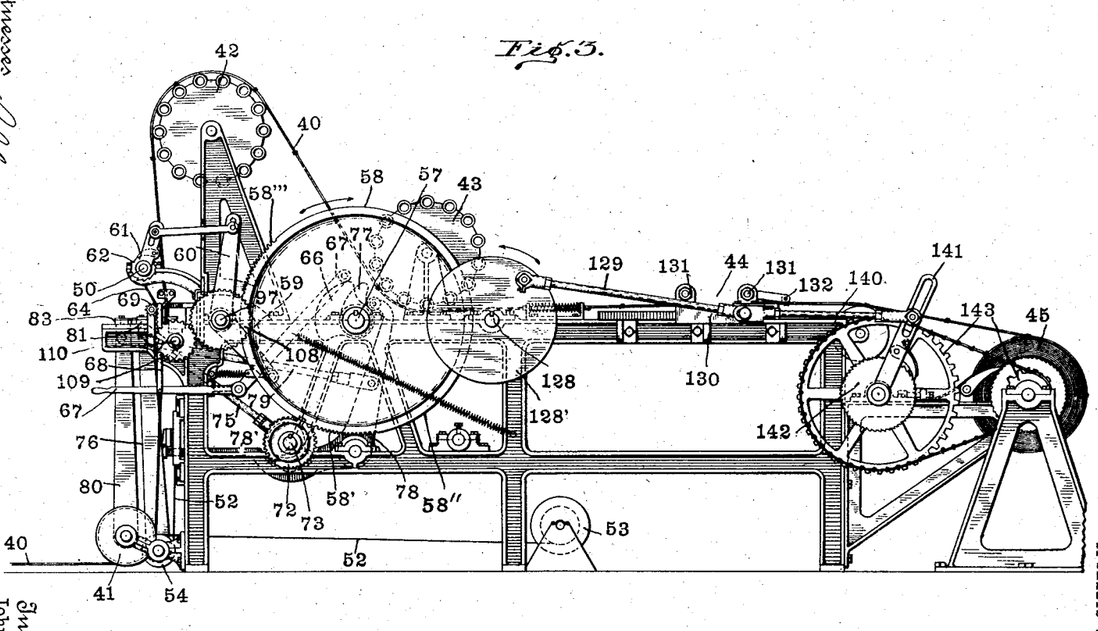
Figs. 5 and 6, a horizontal section immediately above the twister-boxes.
Figure 12:
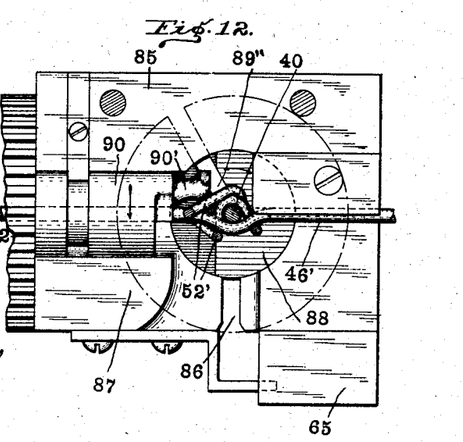
Figure 20:
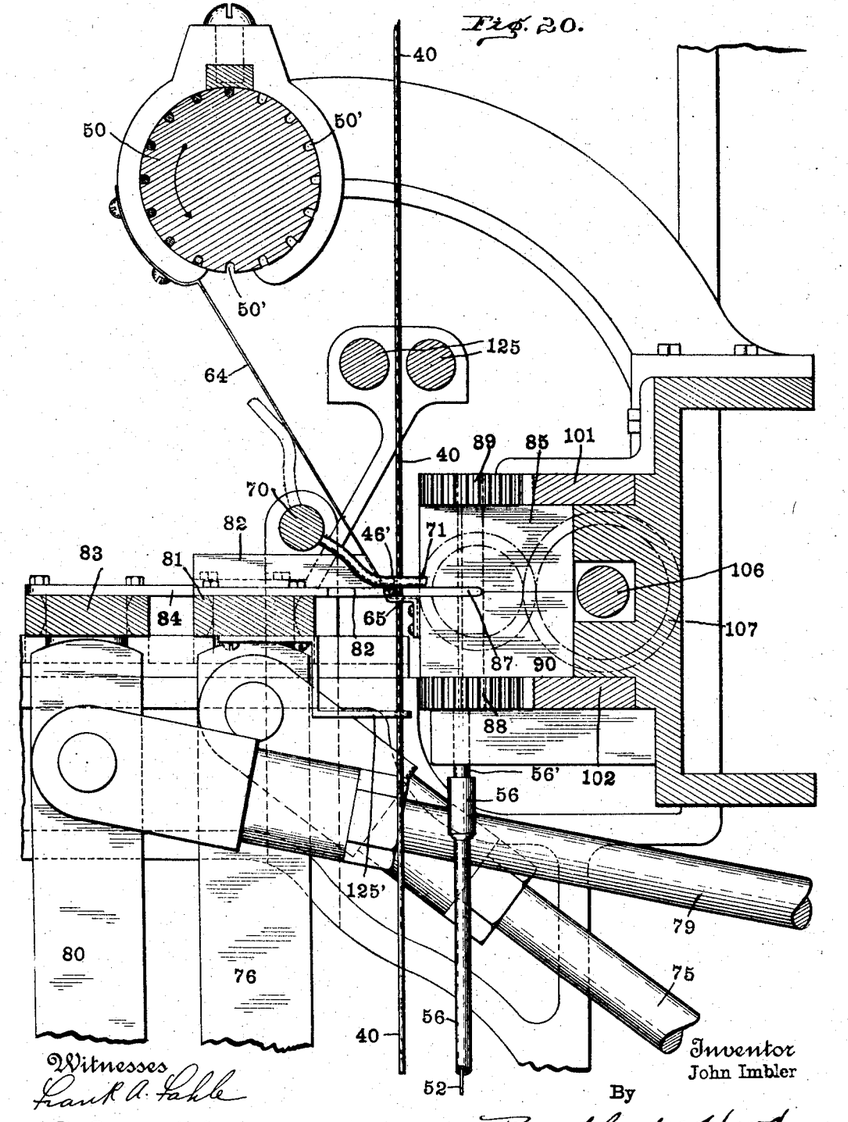
Fig. 20, a considerably enlarged vertical section on line 20 20 of Fig. 2.
Figure 21:
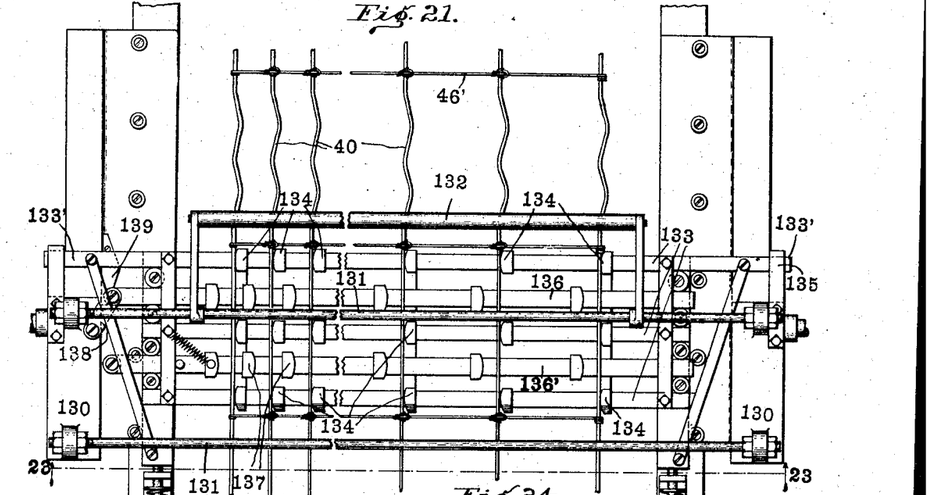
Fig. 21, a detail plan, on an enlarged scale, of the crimping and feeding mechanism.
Figure 22:
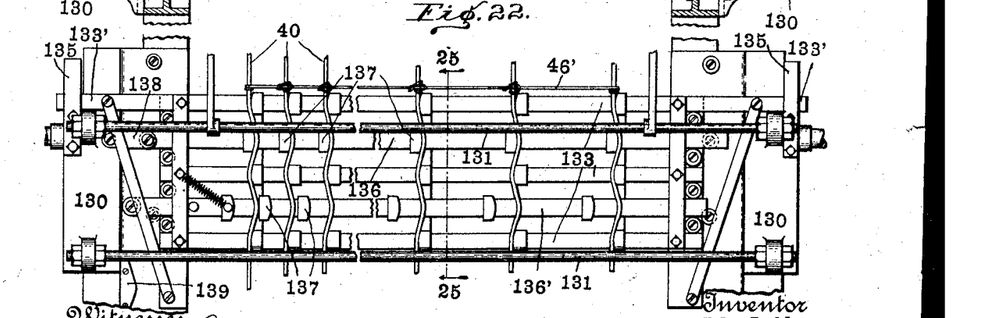
Fig. 22, a similar view showing the parts in the positions occupied immediately after the crimping and feeding has taken place.
Figures 23, 24:
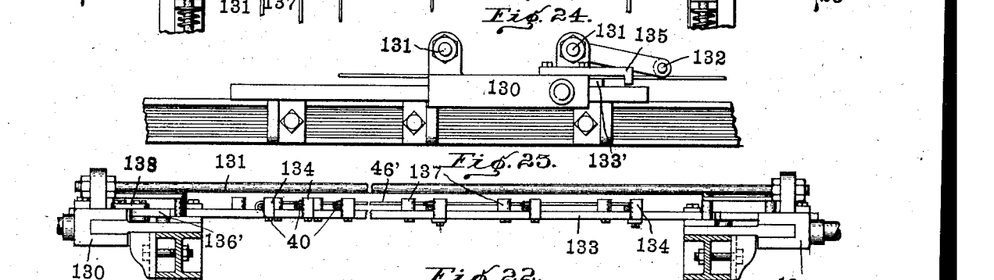
Fig. 23, a vertical section on line 23 23 of Fig. 21.
Fig. 24, a side elevation of the parts shown in Fig. 21.
Figure 25:
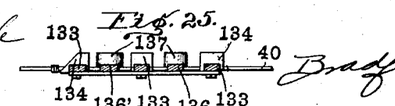
Fig. 25, a section on line 25 25 of Fig. 22.
Figures 26, 27, 28, 29:
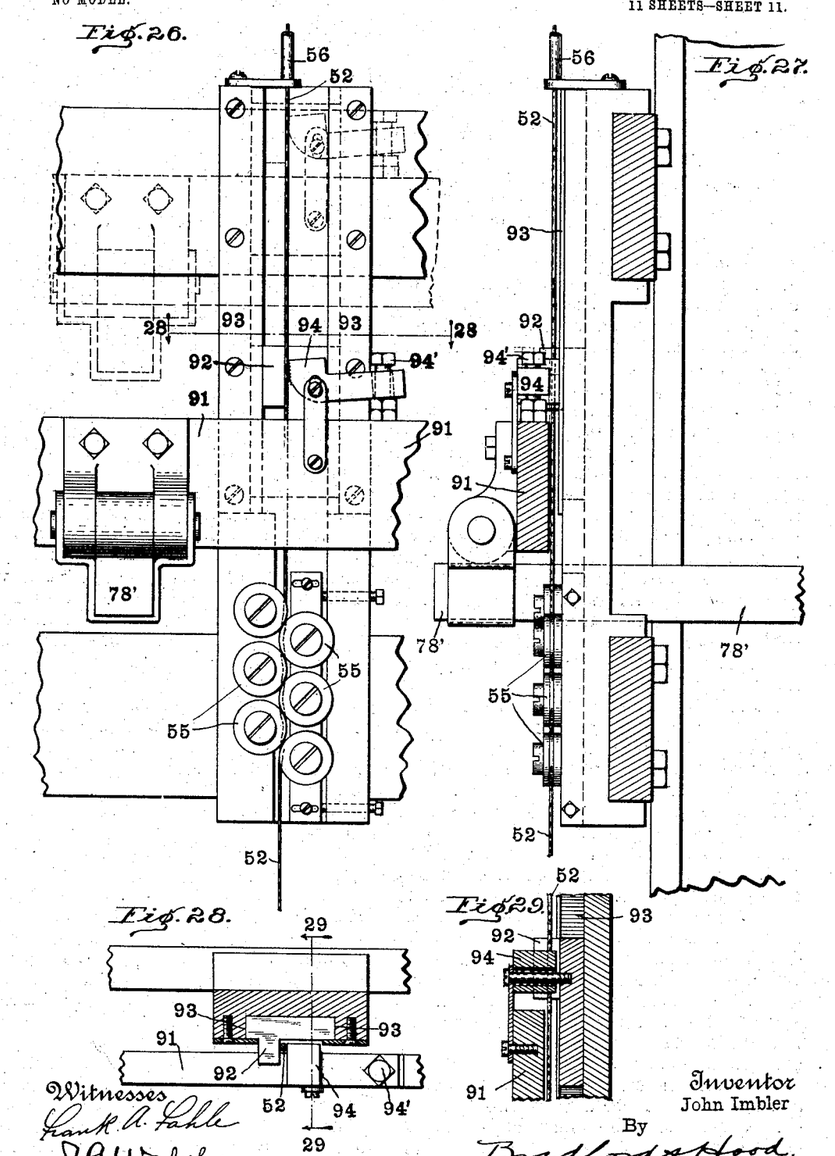
Figures 30, 31, 32, 33:
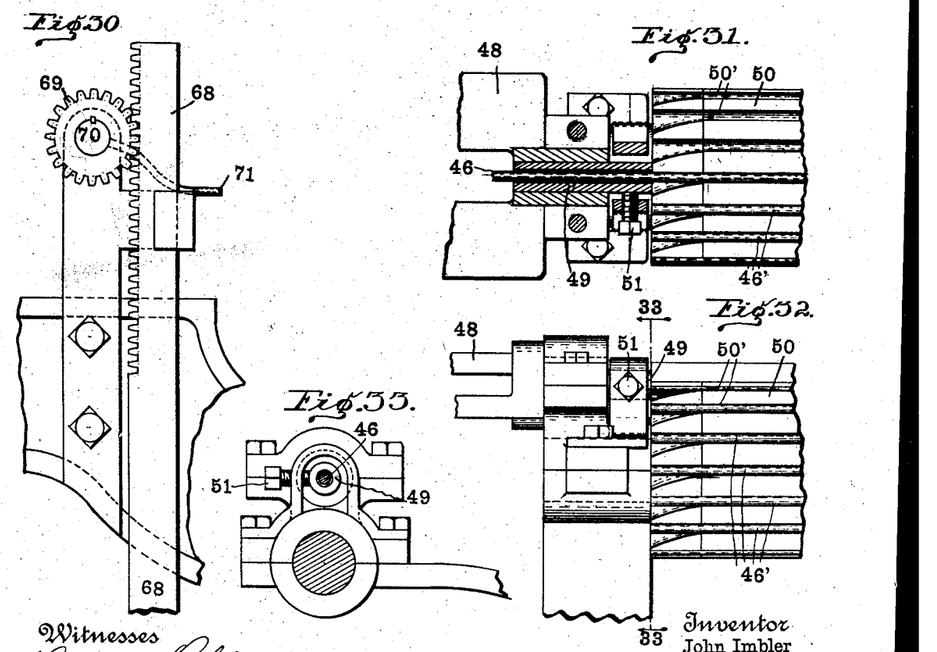
Fig. 30, a detail, on a larger scale, of means for holding the picket-wires down.
Figs. 31 and 32, details of the picket-wire cutter and magazine.
Fig. 33, a detail on line 33 33 of Fig. 32.

Supposing the machine to have been operated a sufficient number of times to fill the magazine 50, the operation has been as follows: The main shaft 57 carries at its right-hand end a large mutilated gear 58, having formed upon its inner side (see dotted lines, Fig. 3) a cam 59, adapted to engage a bell-crank lever 60, which through pawl 61 and ratchet 62 is adapted to advance magazine 50 in the direction indicated by the arrow, Fig. 20, step by step. At the same time the friction-rollers 47 are positively driven by a train of gears 63 from the main shaft 57, so as to push the picket-wires 46 through tube 49 into the adjacent groove 50' of the magazine 50, said wires being pushed the entire length of the magazine and coming against a suitable stop 50", Fig. 1, at the opposite end of the magazine. The train of gears is calculated to be about right to cause the feed-rollers 47 to feed the required amount of picket-wire 46; but if there is any excess movement the rollers 47 will slip upon the wire. The movement of the friction-rollers 47 takes place immediately prior to the time of engagement of cam 59 with lever 60. In Fig. 3 the cam 59 has just passed from engagement with the lever and has caused the magazine 50 to advance one step, thus operating by coaction of the magazine 50 with the tube 49 to cut the wire 46. When the magazine has been filled to the extent shown in Fig. 20 and a further advancement of one step made, a severed picket-wire 46' is discharged from the magazine, so as to slide down along guides 64 and drop upon suitable horizontal supports 65, Fig. 20. Thereupon cam 66 (see dotted lines, Fig. 3) engages lever 67, which lever draws rack 68 downward and through pinion 69 and shaft 70 throws fingers 71 from the position shown in dotted lines in Fig. 20 to the position shown in full lines in said figure down upon the picket-wire 46', said picket-wire being thus held upon the supports 65 and against the running-wires 40. A further advancement of the main shaft 57 brings the toothed portion 58' of the mutilated gear 58, Fig. 3, into mesh with a mutilated gear 72, carried by a shaft 73, and gives said shaft half a revolution. This shaft operates through eccentrics 74, Figs. 1 and 4, upon pitmen 75, each of which at its upper end, Fig. 20, is connected with an upright lever 76. Simultaneous with this movement a cam 77 (see dotted lines in Fig. 3) engages a lever 78, which through pitman 79 is connected with a similar upright lever 80. The upper ends of lever 76 are connected to a slide 81, Figs. 20, 5, and 6, which slide carries a plurality of fingers 82, one closely adjacent each running-wire 40 and each adapted to engage the picket-wire 46'. The levers 80 are similarly connected to a slide 83, which is provided with a corresponding plurality of fingers 84, also adapted to engage the picket-wires 46' on the side of each running-wire 40 opposite that engaged by the fingers 82. When shaft 73 is rotated and lever 78 moved, the two sets of fingers 82 and 84 are moved simultaneously from the position shown in Fig. 20 to that shown in Fig. 13. This action forces the picket-wire 46' and the running-wires 40 into the twister-boxes, now to be described, and forms kinks in the picket-wire, one at each point of engagement with the running-wires, as clearly shown in Figs. 12 and 13.

Figure 10:
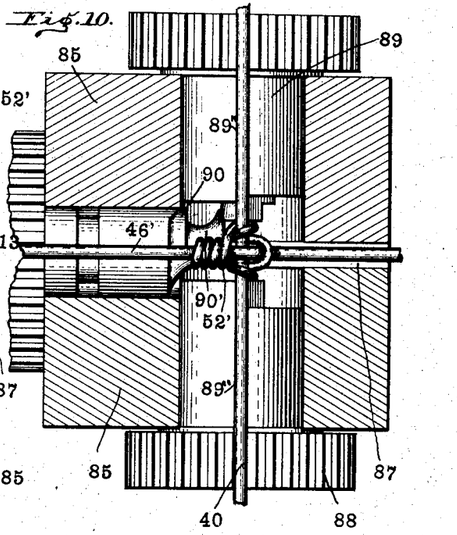
Figures 10, 15:
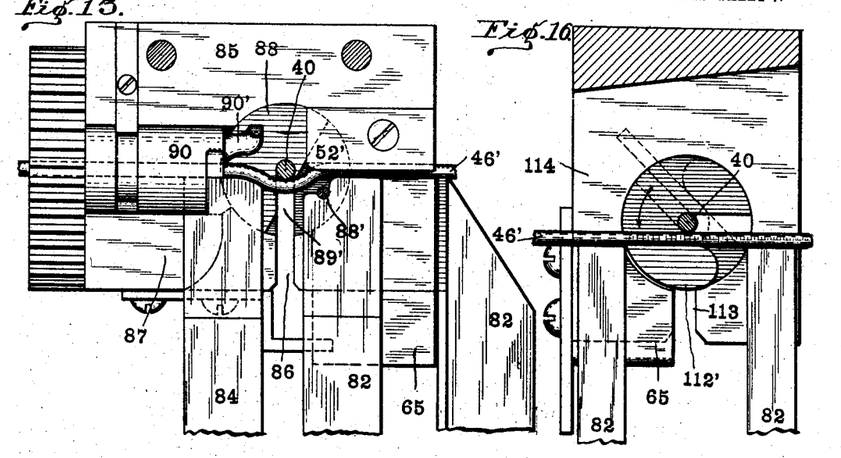
Figure 11:
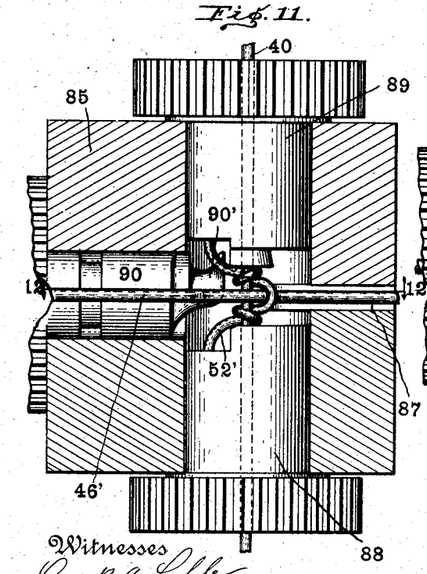
Figure 14:
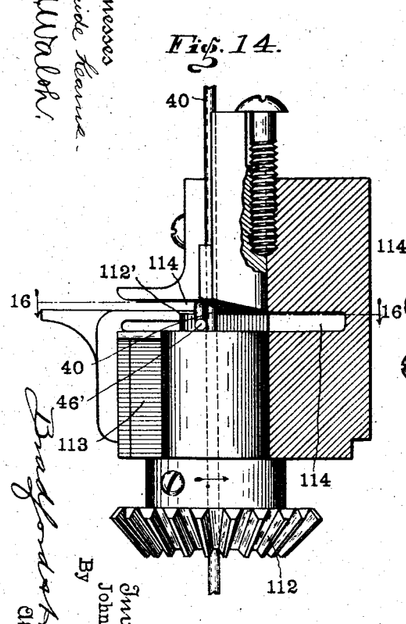
Figures 15, 17, 18, 19:
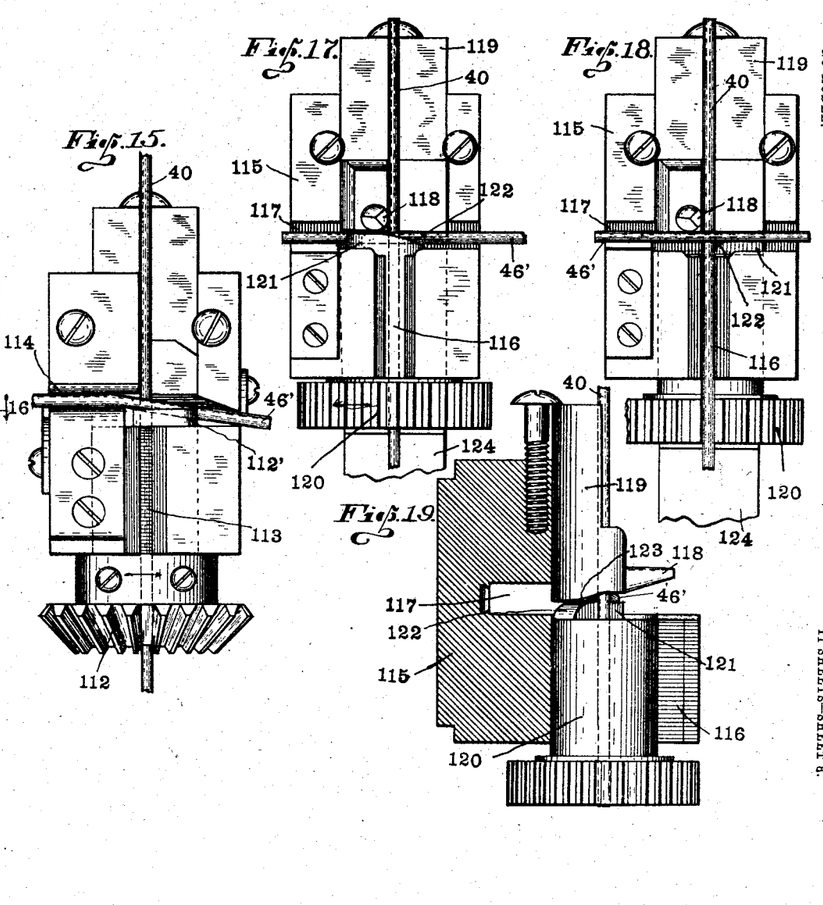

There are three kinds of twister-boxes, that shown in Figs. 14, 15, and 16 being for the upper end or edge of the fabric, that shown in Figs. 17, 18, and 19 for the lower edge of the fabric, and that shown in Figs. 9 to 13, inclusive, for attaching the picket-wire to the intermediate running-wires by means of tie-wires.

Figure 4:
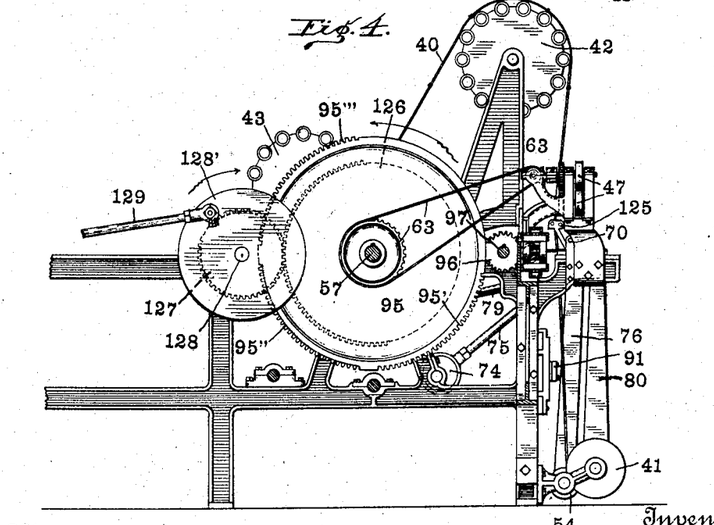
Fig. 4, a section on line 4 4 of Fig. 2.

Each of the intermediate twisters consists of a body-block 85, traversed by two grooves running at right angles to each other across the face of the block, the groove 86 receiving the running-wire 40, while the groove 87 receives the picket-wire 46'. Journaled in the block in line with the groove 86 are two slotted twister-gears 88 and 89, each of which is provided with a slot 89", adapted to register with the slot 86 and extending to the center of the gear. Journaled in line with the slot 87 and at right angles to the twister-gears 88 and 89 is a coöperating twister-gear 90, which is similarly slotted and adapted to receive the picket-wire 46'. The normal position of the three twisters 88, 89, and 90 is that shown in Figs. 9, 10, and 13, and when fingers 82 and 84 have been moved inward, as described, the running-wires 40 and the picket-wires 46' are carried into the adjacent twister-gears, as shown. The fingers 84 are immediately withdrawn; but the fingers 82 remain in position, owing to the period of rest 58" of gear 58, which comes into engagement with the mutilated gear 72 after the fingers 82 and 84 are moved inward. The lever 78 also operates through its arms 78', Fig. 3, to raise bars 91, behind which the tie-wire supplies 52 pass. This bar 91 carries a series of sliding jaws or anvils 92, which are moved in suitable guides 93, one back of each tie-wire supply 52, and said bar also carries adjacent each jaw 92 a swinging jaw 94, loosely hung upon a bolt 94' and provided on the face adjacent jaw 92 with a gripping-surface adapted to grip the adjacent tie-wire supply 52 between it and the jaw 92, so that as bar 91 is moved up the tie-wire supplies 52 are pushed up through their guides 56 and the continuing hollow cutter 56', Fig. 20, and pushed through the planetary openings 88' and 89' of the twister-gears 88 and 89, respectively, the movement of the tie-wire supplies 52 through the openings 88' taking place during the first movement of fingers 82 and 84 and from thence upward taking place after this movement of the fingers has taken place and after the picket-wire 46' has been moved into position, so that the tie-wire lies upon the opposite side of the picket-wire from the running-wire, as clearly shown in Fig. 9. As soon as these movements have taken place the parts are in a position shown in Figs. 1 to 4, inclusive, and a further advancement of shaft 57 moves mutilated gear 95 enough to bring its toothed portion 95', Fig. 4, into engagement with the mutilated gear 96, Figs. 1 and 5, which is secured to shaft 97 and operates through a suitable train of gearing 98 upon a cranked disk 99, which through pitman 100 operates upon a pair of racks 101 and 102, Figs. 5 to 8 and Fig. 20, upon the twister-gears 88 and 89.

The first movement of these gears causes the cutter 88″ of each gear 88 to cooperate with its adjacent tubular cutter 56′ to sever a portion from each tie-wire supply, and thus produce a tie-wire 52′, Figs. 9 to 13. Thereupon the ends of the tie-wire 52′ are carried around the running-wire 40 a trifle more than one turn, the tie-wire being doubled about the picket 46′ and then wrapped about the running-wire upon opposite sides of the picket, as clearly shown in Fig. 11. This movement is accomplished by one revolution of the mutilated gear 96, whereupon said gear and consequently the twisting-gears 88 and 89 come to rest and a toothed portion 95″ of the mutilated gear 95 comes into mesh with a mutilated gear 103, Figs. 1 and 5, which is journaled loosely upon shaft 97. This gear 103 carries a gear 104, which meshes with a gear 105, carried by shaft 106, which shaft carries a plurality of gears 107, (shown in dotted lines in Figs. 5 and 6,) meshing with the twister-gears 90. The movement of gear 103 thus rotates said twister-gears two complete revolutions, carrying the horn 90′, Figs. 9 to 13, of each twister-gear 90 around behind the ends of the tie-wire 52′, which still lie in planetary holes 88′ and 89′, and draws said ends from the twister-gears 88 and 89 and wraps said ends about the picket-wire 46′ on that side of the running-wire opposite to the middle doubled portion of the tie-wire, as clearly shown in Fig. 10.

Figure 6:
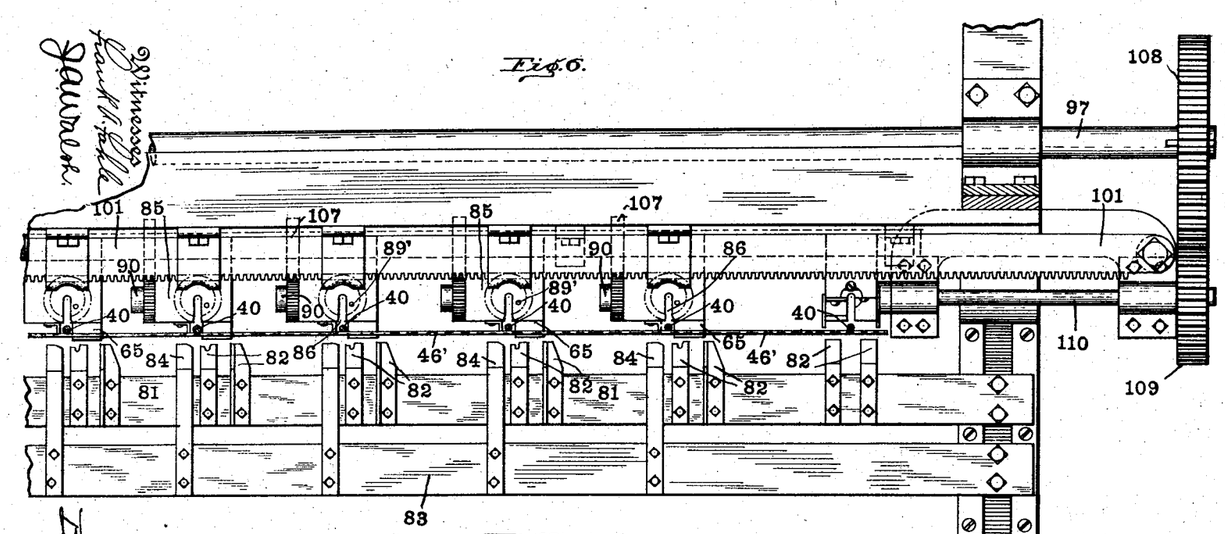
Figure 8:
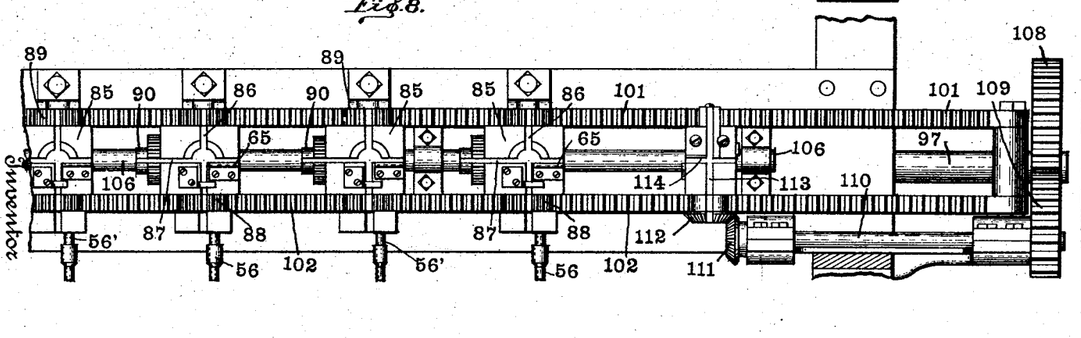
Figure 9:
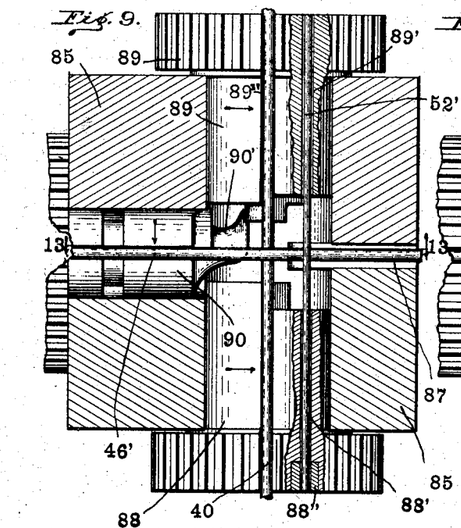

While the operation of the gears 88 and 89 is taking place the shaft 97 rotates gear 108, Figs. 6 and 8, and through gear 109, shaft 110, and beveled gear 111 rotates the gear 112, which forms a part of the twister-box illustrated in Figs. 14, 15, and 16. This box is provided on its face with a pair of receiving-grooves 113 and 114, which lie at right angles to each other and are adapted to receive the upper running-wire 40 and the upper end of the picket-wire 46′, respectively. The groove 114, however, is offset at opposite sides of the groove 113, as clearly shown in Figs. 14 and 15. The rotation of gear 112 (which is journaled in the twister-head in line with the slot 113 and is slotted to its center to receive the running-wire 40) brings a block 112′ into engagement with the offset end of the picket-wire 46′, Figs. 15 and 16, and wraps said end about the running-wire, the beginning of said wrap being indicated in dotted lines of Fig. 16. When these wraps have taken place, a third toothed portion 95‴ of gear 95 comes into mesh with the gear 96 and gives it another complete revolution, thus causing the racks 101 and 102 to be returned, the gears 88 and 89 thus being returned to normal position. On the return movement of these racks the twister illustrated in Figs. 17 to 19 comes into action, although it remains inactive in the forward stroke. This twister consists of a body-block 115, provided with a pair of slots 116 and 117, arranged at right angles to each other and adapted to receive the adjacent running-wire 40 and picket-wire 46′, respectively, the picket-wire being guided into place by means of a suitable finger 118, carried by an adjustable block 119, adjusted longitudinally of the running-wires. Journaled in line with block 119 and in line with slot 116 is a twister-gear 120, which carries at its inner end a twister-block 121, which at its forward end is provided with a cam 122, adapted to cooperate with a cam-surface 123, formed on the inner end of block 119, the arrangement being such that when the twister-gear 120 is rotated in the direction opposite to that indicated in the arrow in Fig. 17 (by the first or forward movement of rack 102) it will pass freely around and be displaced longitudinally by the cam 123 and the picket-wire 46′, so as not to engage said picket-wire with a wrapping action, longitudinal displacement being permitted by reason of a spring-support 124. Upon the return stroke of rack 102, however, the coaction of cams 122 and 123 no longer prevents the block 121 from engaging with the picket-wire 46′, as clearly shown in Fig. 17, and the picket-wire is consequently wrapped about the adjacent running-wire at this end and in a direction opposite to the wrap of the picket-wire at the other edge of the fabric. When this wrapping has taken place, further advancement of the shaft 57 brings the toothed portion 58‴ of gear 58, Fig. 3, into engagement with the mutilated gear 72 and gives said gear another half-turn, whereupon fingers 82 are retracted. The bar 81 carries, in addition to fingers 82, a series of guides 125, Fig. 20, one for each running-wire 40, and also a series of corresponding guides 125′, so that when the bar 81 is retracted the running-wires, with the attached picket-wire, are positively withdrawn from the twisting mechanism. Thereupon during the period of rest which follows toothed portion 58‴ the toothed portion of a mutilated gear 126 (shown in dotted lines in Fig. 4 and in full lines in Fig. 1) comes into mesh with a mutilated gear 127, which, through shaft 128, Fig. 1, cranked plates 128′, and pitman 129, reciprocates the slides 130. The two slides 130, Figs. 21 to 25, are connected by cross-bars 131, which extend over the fabric, and pivoted on one of these bars is a bar 132, which rests freely upon the fabric, so as to hold it down into position. Slidably supported upon the main frame is a grid consisting of three cross-bars 133, each of which is provided with a series of posts 134, arranged one adjacent each running-wire and having the face adjacent said wire curved, as shown. The grid thus formed is provided with extensions 133′, which lie upon slides 130 and have a limited movement thereon by reason of the fingers 135. Arranged between bars 133 are bars 136 and 136′, provided with blocks 137, which are the complement of the blocks 134. The bar 136 is connected by a link 138 with the adjacent slide 130, so that when slides 130 are moved to the rear by a rotation of the shaft 128 the said slides will move without moving the grid 133, but the link 138 will be swung and straightened out in line with the attached bar 136, so as to force said bar over to the right and cause the posts 137 thereof to engage the running-wires and kink the same between the opposite posts 134. The fabric is thus gripped, so that when extensions 133' are engaged by the slides 130 the grid 133 will be moved to the rear and the fabric drawn through the machine. As this movement takes place the bar 136' has one of its ends brought into engagement with the stationary cam 139 and is moved thereby in a manner similar to the movement of the bar 136, so as to produce a kink in the running-wires between the adjacent posts 134. As the slides 130 are moved to the rear the pitman 140, which is connected to one of said slides, operates a ratchet-arm 141, which through ratchet 142 and gearing 143 operates through a friction-clutch 144 (of a well-known type) upon the winding-drum 45, so as to wind the fabric up as it is fed from the machine. The feeding and kinking mechanism is drawn back to normal position upon the completion of the rotation of the shaft 128, and the parts continue the operation already described.

It will be noticed that the operation of the entire machine is automatic in every particular, the running-wires, the material for the picket-wires, and the material for the tie-wires being fed continuously into the machine. As a consequence the fabric can be made very rapidly and will be very uniform.

I claim as my invention—

1. In a wire-fence machine, the combination, with means for supporting and feeding a plurality of running-wires, of means for feeding a picket-wire supply into said machine, means for cutting said picket-wire supply in the desired lengths and for feeding said lengths in succession to the running-wires, means for feeding a supply of tie-wire to points of intersection of the picket-wires and running-wires, means for cutting said tie-wire supplies into the desired lengths, and means for wrapping said tie-wire about the picket and running wires.

2. In a wire-fence machine, the combination, with means for supporting and feeding a plurality of running-wires, of means for associating successive picket-wires with said running-wires, and means for automatically attaching the picket-wires to the running-wires by means of tie-wires doubled about one of the crossing wires upon one side of the other wire, thereupon wrapping opposite ends of the tie-wire about the other wire upon opposite sides of the first wire, and thereafter wrapping the ends of the tie-wire about the first wire upon the side of the second wire opposite to that of the first point of engagement.

3. In a wire-fence machine, means for attaching a tie-wire about two crossing wires, which means consists of, a main body; a pair of alined twister-gears adapted to rotate about one of the wires and provided with means for engaging the tie-wire, doubling it about the crossing wire, and wrapping the ends about the first-mentioned wire upon opposite sides of said crossing wire; and a twister-gear adapted to rotate about the crossing wire as an axis and provided with means for engaging the ends of the tie-wire and twisting them about said crossing wire.

4. In a wire-fence machine, means for attaching a tie-wire to a pair of crossing wires, which means consists of, a main body; a pair of alined twister-gears journaled in said main body, said twister-gears being adapted to receive one of the crossing wires, and each having a planetary tie-wire-receiving opening formed longitudinally therethrough to receive the tie-wire, said twisting-gears being adapted to double the tie-wire upon the crossing wire and wrap the ends of said tie-wire about the first wire upon opposite sides of the crossing wire; and a third twister-gear journaled in the main body at right angles to the other twister-gears and adapted to receive and rotate about the crossing wire, said twister-gear being provided with means for engaging the ends of the tie-wire, withdrawing them from the first-mentioned twister-gears, and twisting said ends about the crossing wire.

5. In a wire-fence machine, means for attaching a tie-wire to a pair of crossing wires, which means consists of, a main body; a pair of alined twister-gears journaled in said main body, adapted to receive one of the crossing wires, and each having a planetary tie-wire-receiving opening formed longitudinally therethrough to receive the tie-wire, and a cutter carried by one of said twister-gears to sever the tie-wire from its supply, said twisting-gears being adapted to double the tie-wire upon the crossing wire and wrap the ends of said tie-wire about the first wire upon opposite sides of the crossing wire; and a third twister-gear journaled in the main body at right angles to the other twister-gears and adapted to receive and rotate about the crossing wire, said twister-gear being provided with means for engaging the ends of the tie-wire, withdrawing them from the first-mentioned twister-gears, and twisting said ends about the crossing wire.

6. In a wire-fence machine, a twister for twisting one end of a picket-wire about the adjacent running-wire, consisting of, a main body provided with a slot adapted to receive the running-wire, and also having formed therein a slot crossing the first-mentioned slot and offset upon opposite sides of the first-mentioned slot; guides arranged to guide the picket-wire into the offset portions of said slot and displace the end of the picket-wire in the line of the running-wire; a twister-gear journaled in the main body in alinement with the first-mentioned slot and having a radial slot extending to or near its axis; and a block or finger carried by the inner end of said twister-gear and adapted to engage the offset end of the picket-wire and wrap the same about the running-wire.

7. In a wire-fence machine, means for twisting one end of a picket-wire about the adjacent running-wire, consisting of, a main body provided with a pair of wire-receiving slots; a twister-gear journaled in said main body in alinement with the running-wire-receiving slot and having a radial slot formed therein, extending to or near the axis; a twister-block 121 carried by said twister-wheel and provided at its rear end with a cam-face 122 whereby said block may act upon the picket in one direction only; a coacting cam carried by the main body in position to coöperate with said cam-face 122; and means for yieldingly urging the gear in opposition to said cams, for the purpose set forth.

8. In a wire-fence machine, the combination, with means for supporting and feeding a plurality of running-wires therethrough, of means for attaching picket-wires to said running-wires by means of tie-wires wrapped about the points of intersection, and means for feeding said tie-wires to the wrapping means, said means consisting of a reciprocating bar 91, anvil 92 carried thereby, the vertical bolt 94', and a jaw 94 coöperating with anvil 92 and loosely mounted upon bolt 94', all substantially as and for the purpose set forth.

9. In a wire-fence machine, the combination, with means for supporting and feeding a plurality of running-wires therethrough, of a picket-wire receiver adapted to receive the end of a picket-wire supply, means for introducing said picket-wire supply into said receiver, means for severing the picket-wire supply, and means for moving said receiver to transfer the severed picket toward the fabric.

10. In a wire-fence machine, the combination, with means for supporting and feeding a plurality of running-wires therethrough, of a picket-wire magazine consisting of a rotating drum having formed in its periphery a plurality of picket-wire-receiving grooves, means for introducing picket-wires into said grooves, and means for advancing said magazine step by step, whereby the picket-wires may be successively advanced from receiving position.

11. In a wire-fence machine, the combination, with means for supporting and feeding a plurality of running-wires therethrough, of a picket-wire magazine consisting of a rotatable body having formed in its periphery a plurality of picket-wire-receiving grooves, a cutter formed at one end of said magazine and having cutting portions registering with said picket-wire-receiving grooves, a stationary cutter coöperating with said cutter, means for feeding a picket-wire supply between said cutters and into the magazine-grooves, and means for advancing said magazine step by step.

12. In a wire-fence machine, the combination, with means for supporting and feeding a plurality of running-wires therethrough, of feeding and crimping means consisting of a pair of transverse arms provided with blocks adapted to engage the running-wires each upon one side, a third transverse bar provided with blocks adapted to engage each of the running-wires upon the opposite side from the first-mentioned blocks, a carriage adapted to engage the first-mentioned bars and move them longitudinally of the fabric after a limited free movement, means operating during said limited free movement for engaging the third bar and shifting the same transversely, and means for carrying said bar with the first two bars in the movement parallel with the running-wires.

13. In a wire-fence machine, the combination, with means for supporting a plurality of running-wires therein, of feeding and kinking means for said running-wires consisting of a grid composed of three transverse bars each provided with blocks adapted to engage the running-wires upon one side, a fourth transverse bar arranged between the first two bars and provided with blocks adapted to engage the running-wires upon the opposite side, a carriage adapted to engage the grid and move the same longitudinally of the running-wires but having a limited movement with relation thereto, means for connecting said carriage and said fourth bar, a fifth bar arranged between the second two grid-bars and provided with blocks adapted to engage the running-wires upon the opposite sides from the blocks of the grid-bars, and a cam arranged in the path of movement of said fifth bar to shift the same transversely of the running-wires, for the purpose set forth.

In witness whereof I have hereunto set my hand and seal, at Indianapolis, Indiana, this 25th day of January, A. D. 1904.

JOHN IMBLER. [L. S.]

Witnesses:
ARTHUR M. HOOD,
JAMES A. WALSH.